US009700975B2

(12) United States Patent
Kelkar

(10) Patent No.: US 9,700,975 B2
(45) Date of Patent: Jul. 11, 2017

(54) FIVE-AXIS MACHINING APPARATUS

(71) Applicant: Nitin Narayan Kelkar, Nasik (IN)

(72) Inventor: Nitin Narayan Kelkar, Nasik (IN)

(73) Assignee: Nitin Narayan Kelkar, Maharashtra (IN)

( * ) Notice: Subject to any disclaimer, the term of this patent is extended or adjusted under 35 U.S.C. 154(b) by 0 days.

(21) Appl. No.: 15/108,949

(22) PCT Filed: Dec. 30, 2014

(86) PCT No.: PCT/IN2014/000802
§ 371 (c)(1),
(2) Date: Jun. 29, 2016

(87) PCT Pub. No.: WO2015/111070
PCT Pub. Date: Jul. 30, 2015

(65) Prior Publication Data
US 2017/0001273 A1    Jan. 5, 2017

(30) Foreign Application Priority Data

Dec. 30, 2013 (IN) .......................... 4099/MUM/2013

(51) Int. Cl.
*B23Q 1/01* (2006.01)
*B23Q 1/54* (2006.01)
(Continued)

(52) U.S. Cl.
CPC ............. *B23Q 1/015* (2013.01); *B23Q 1/017* (2013.01); *B23Q 1/488* (2013.01); *B23Q 1/5406* (2013.01);
(Continued)

(58) Field of Classification Search
CPC ............. Y10T 29/5109; Y10T 29/5114; Y10T 409/305824; Y10T 409/30896; Y10T 409/309576; B23Q 1/488; B23Q 1/5406
(Continued)

(56) References Cited

U.S. PATENT DOCUMENTS

2013/0206438 A1* 8/2013 Hessbrueggen ......... B23Q 1/64 173/39
2013/0210594 A1* 8/2013 Schuster .................. B23Q 1/64 483/22

FOREIGN PATENT DOCUMENTS

CN   201195245 Y   2/2009
CN   202665727 U   1/2013
(Continued)

OTHER PUBLICATIONS

EPO Machine Translation of CN202665727U—Wang, "Five-Shaft Linkage Dental Milling Machine", May 17, 2012.*
(Continued)

*Primary Examiner* — Sunil K Singh
*Assistant Examiner* — Michael Vitale
(74) *Attorney, Agent, or Firm* — Baker Hostetler LLP

(57) ABSTRACT

Disclosed is a five axis machining apparatus. The five axis machining apparatus comprises a base member, a support member, a stationary base, a first moving plate, a second moving plate, a third moving plate, a fourth moving frame, a fifth moving frame and a controller (not shown). The five axis machining apparatus is designed to hold together A, C and X axes thereby resulting in a reduced size without compromising on rigidity that is required for processing metallic job components. The five axis machining apparatus allows independent as well as simultaneous control of X, Y, Z, A and C axes.

9 Claims, 7 Drawing Sheets

(51) Int. Cl.
*B23Q 1/48* (2006.01)
*B23Q 1/62* (2006.01)

(52) U.S. Cl.
CPC ........... *B23Q 1/621* (2013.01); *Y10T 29/5114* (2015.01); *Y10T 409/30896* (2015.01); *Y10T 409/305824* (2015.01); *Y10T 409/309576* (2015.01)

(58) Field of Classification Search
USPC ................ 409/168, 224, 235; 29/27 C, 27 R
See application file for complete search history.

(56) References Cited

FOREIGN PATENT DOCUMENTS

| | | | | |
|---|---|---|---|---|
| CN | 203171257 U | 9/2013 | | |
| DE | 102009007933 A1 | * 6/2009 | ............. | B23C 1/002 |
| JP | 07-88737 | 4/1995 | | |
| WO | WO 2006106273 A1 | * 10/2006 | ............. | B23Q 1/015 |

OTHER PUBLICATIONS

International Search Report issued in International Patent Application No. PCT/IN2014/000802 mailed Aug. 3, 2015.

\* cited by examiner

The Smooth Rigid Motion of the First, Second, and Third Moving Plates can Alternatively be Achieved by Either a Respective Bush, Dovetail, or Roller Guide

FIGURE 6

The First, Second, Third, Fourth, and Fifth Driving Units can Alternatively be Embodied as any of a Harmonic Drive, a Cycloid Drive, a Worm Wheel Gear Box, or a Worm Wheel and Shaft Unit

FIGURE 7

FIVE-AXIS MACHINING APPARATUS

REFERENCE TO RELATED APPLICATIONS

This application is the U.S. national stage of International Application No. PCT/IN2014/000802, filed Dec. 30, 2014, which claims priority to Indian Application No. 4099/MUM/2013, filed Dec. 30, 2013, the disclosures of which are incorporated herein by reference in their entirety.

FIELD OF THE INVENTION

The present invention relates to a machining apparatus and more particularly, to a five-axis machining apparatus, for example, a CNC machine.

BACKGROUND

The traditional machines for processing of a job are operated manually and hence, the precision of the job depends on the skills and expertise of an operator. To minimize the role of the operators, computer numerical control (herein after "CNC") machines are developed. The CNC machine comprises a computer in which the operator has to merely feed the program of instructions for cutting the job as per the requirements, load the required tools in the machine and rest of the work is done by the computer automatically. Typical CNC machines support translation in two or three axes. Recent advancements in technology have led to the development of five-axis CNC machines.

Presently available five-axis CNC machines are designed to mount A and B axes on a table that moves in X axis. When processing smaller job components such as a watch case, small impeller, jewelry components or dental bridges that have a size of 100 mm or even smaller, the construction of X axis with the moving table becomes a non-essential part and unnecessarily increases the size and weight of the machine thereby making the machine quite bulky. Further, these designs use higher capacity Linear Motion Guides (LMGs) and ball screws for moving the table thereby increasing the cost of construction and that of the machine.

Many attempts have been made in the past to design a compact five-axis CNC machine especially for holding and processing smaller job components. However, such attempts have resulted in reducing the strength and rigidity of the CNC machines rendering the machines ineffective for processing of metallic jobs.

Accordingly, there exists a need of a compact five-axis machining apparatus that overcomes the drawbacks of the prior art.

An aspect of the present disclosure is to provide a compact five-axis machining apparatus that is easily mountable on a table for holding and processing smaller job components.

SUMMARY

Accordingly, the present disclosure provides a five-axis machining apparatus. The five-axis machining apparatus comprises a base member, a support member, a stationary base, a first moving plate, a second moving plate, a third moving plate, a fourth moving frame, a fifth moving frame and a controller.

The support member extends vertically from one end of the base member. The stationary bases is mounted in X axis on top of the base member. The first moving plate is configured in X axis on the stationary base. The first moving plate is capable of being driven by a first driving mechanism. The second moving plate is mounted in Y axis on an upper portion of the support member. The second moving plate is capable of being driven by a second driving mechanism. The third moving plate is mounted in Z axis on the second moving plate. The third moving plate is capable of being driven by a third driving mechanism.

The third moving plate includes a spindle mounted thereon. The spindle includes a cutting tool configured therein. The spindle undergoes linear vertical movement when the third moving plate is driven by the third driving mechanism. The spindle undergoes linear horizontal movement when the second moving plate is driven by the second driving mechanism.

The fourth moving frame is configured in A axis on the first moving plate. The fourth moving frame is adapted for being driven in response to the movement of the first moving plate to drive a first shaft to move in X axis. The fourth moving frame comprises a fourth driving mechanism configured therein for further driving the first shaft to rotate in A axis. The first shaft is configured on a lower portion of the support member through one end thereof.

The fifth moving frame is mounted in C axis on another end of the first shaft. The fifth moving frame is adapted for moving in X axis in response to the movement of the first moving plate and for swinging in A axis in response to the rotation of the first shaft. The fifth moving frame comprises a second shaft, a chuck and a fifth driving mechanism. The chuck is mounted on the second shaft for holding a job and the fifth driving mechanism drives the second shaft to rotate and in turn rotate the chuck in C axis. The linear movement of the fifth moving frame in X axis, swinging movement of the fifth frame in A axis and rotation of the chuck in C axis results in positioning the job at various locations with respect to the cutting tool.

Typically, the first moving plate, the second moving plate and the third moving plate are configured with any of linear motion (LM) rails, a bush, a dovetail and a roller guide for undergoing smooth rigid motion. Each driving mechanism includes a motor and a driving unit connected thereto. The motors of the first, second and third driving mechanisms are selected from any of a rotary motor and a linear motor. The motors of the fourth and fifth driving mechanisms are rotary motors. The driving units are selected from any of a timing belt and pulley, a harmonic drive, a cycloid drive, a worm wheel gear box, a worm wheel and shaft unit.

The controller for example, a computer numerical control controller is adapted for controlling the movements of the first moving plate, the second moving plate, the third moving plate, the first shaft and the second shaft.

BRIEF DESCRIPTION OF THE DRAWINGS

The aspects and advantages of the present disclosure will become apparent from the following description read in accordance with the accompanying drawings wherein.

FIG. 6 schematically shows alternate embodiments for the smooth rigid motion of the plates;

FIG. 7 schematically shows alternate embodiments of the driving units.

DETAILED DESCRIPTION

The foregoing aspects of the disclosure are accomplished and the problems and shortcomings associated with the prior art techniques and approaches are overcome as described below in the preferred embodiment.

The present disclosure describes a compact five-axis machining apparatus that is easily mountable on a table for holding and processing smaller job components. The five-axis machining apparatus allows independent as well as simultaneous control of five axes during processing of the jobs.

This present disclosure is illustrated with reference to the accompanying drawings, throughout which reference numbers indicate corresponding parts in the various figures. These reference numbers are shown in bracket in the following description.

Figure 1:
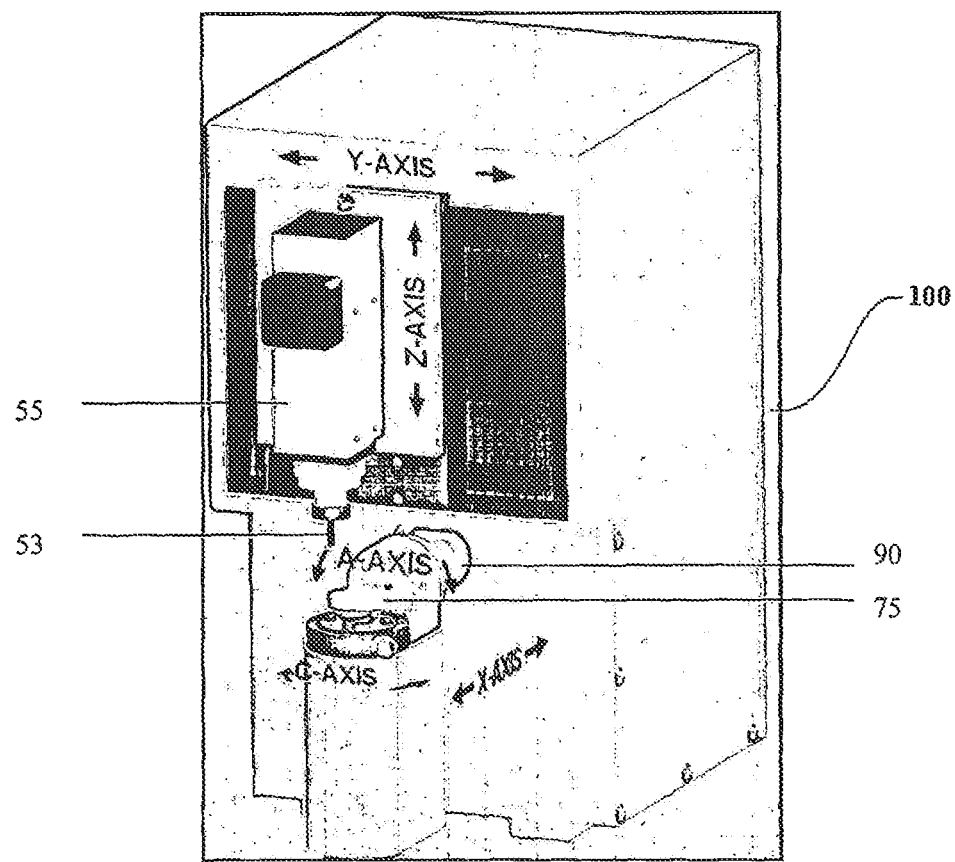
FIG. 1 is an isometric view of a five-axis machining apparatus showing A-axis positioned at zero degree rotation, in accordance with the present invention.
Figure 2:
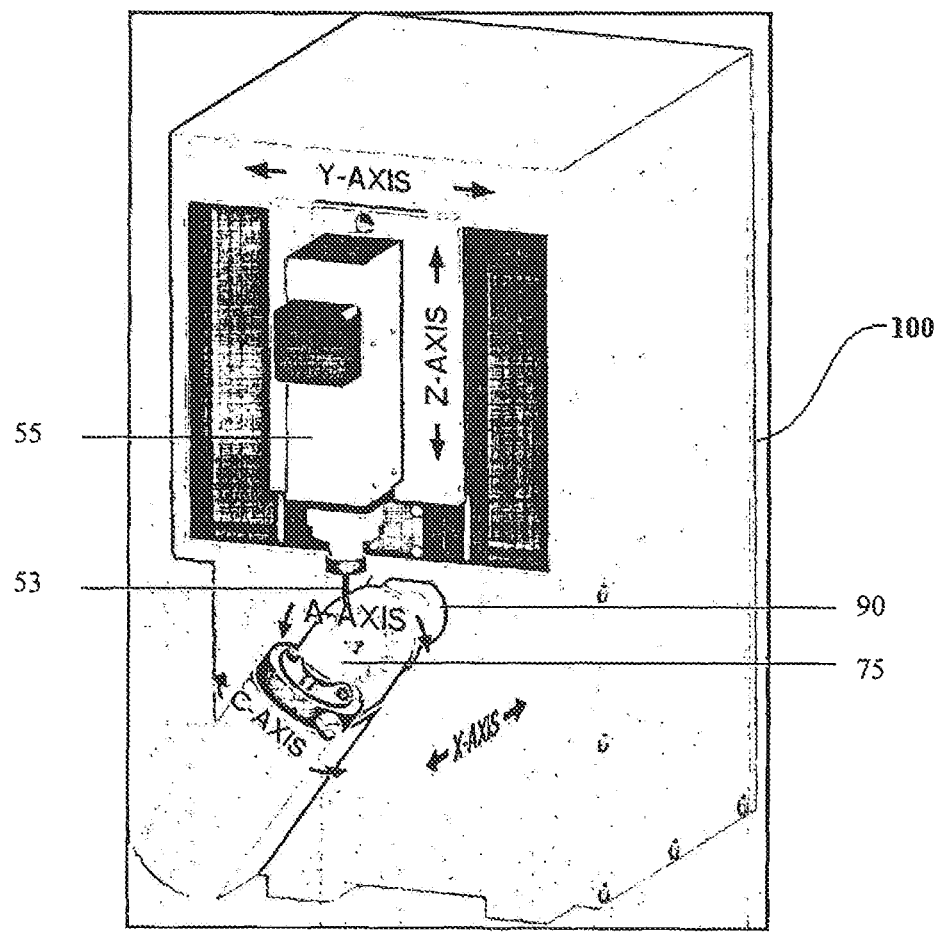
FIG. 2 is another isometric view of the five-axis machining apparatus of FIG. 1 showing A-axis positioned at 45 degree rotation.
Figure 3:
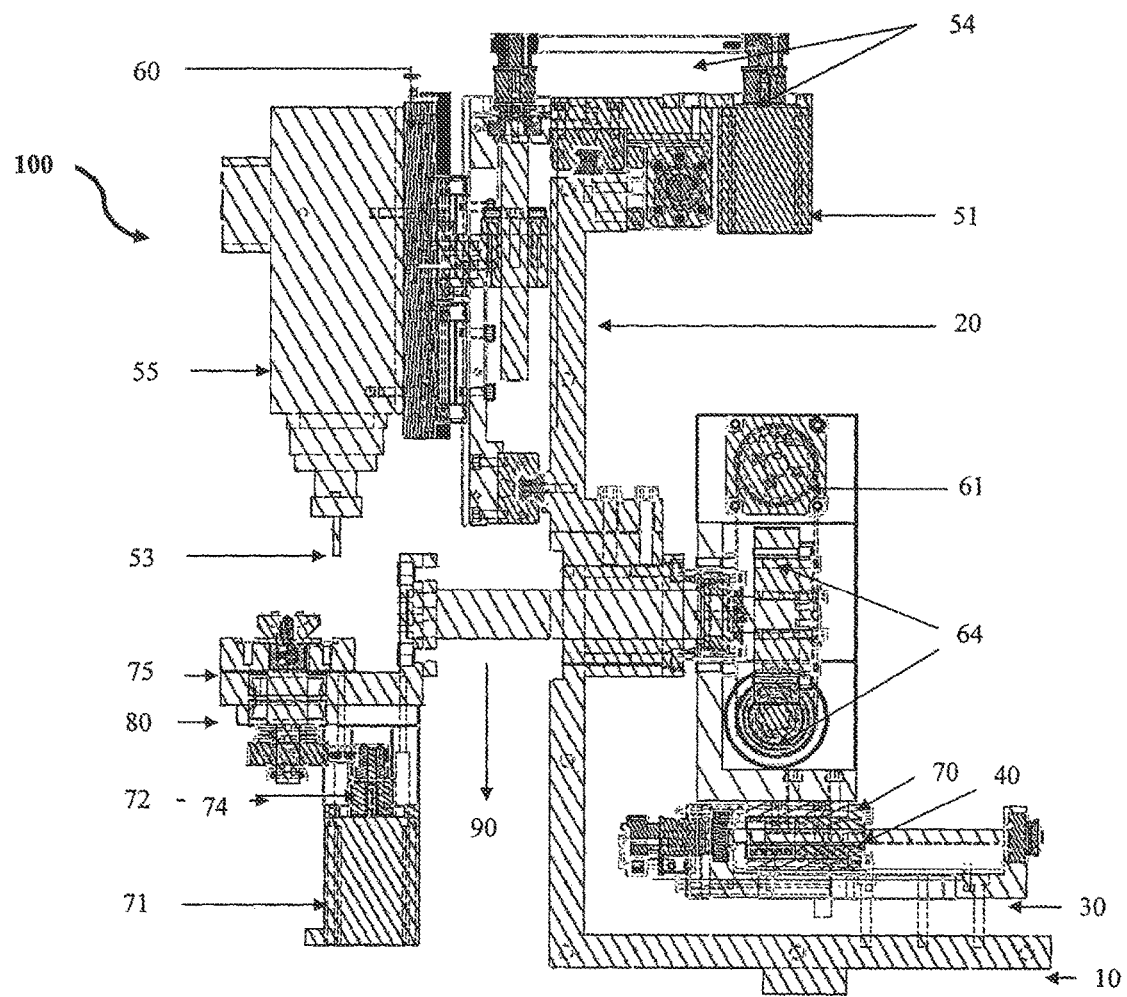
FIG. 3 shows a schematic view of the five-axis machining apparatus of FIG. 1.
Figure 4:
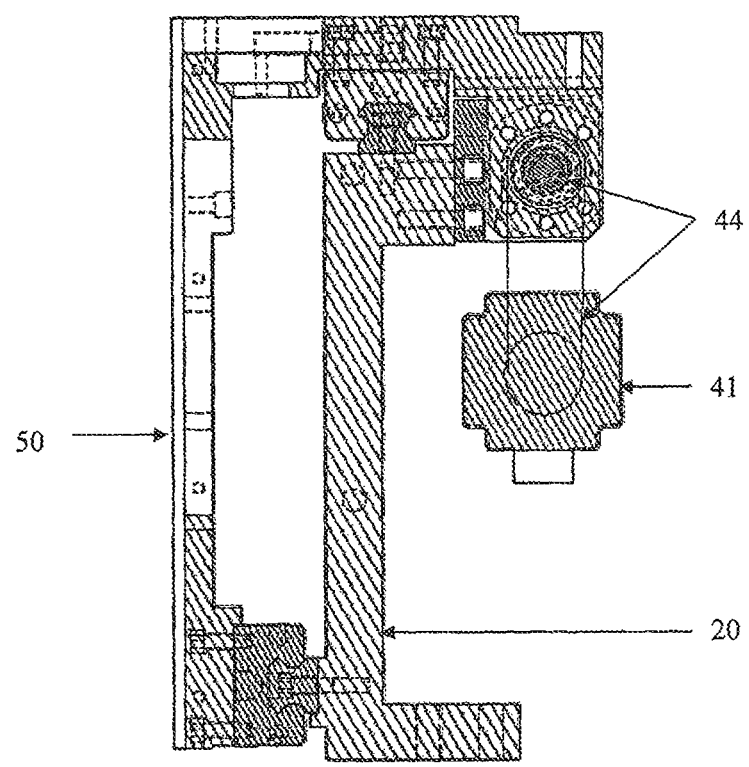
FIG. 4 shows a schematic view of a second moving plate mounted in Y axis of the five-axis machining apparatus of FIG. 1.
Figure 5:
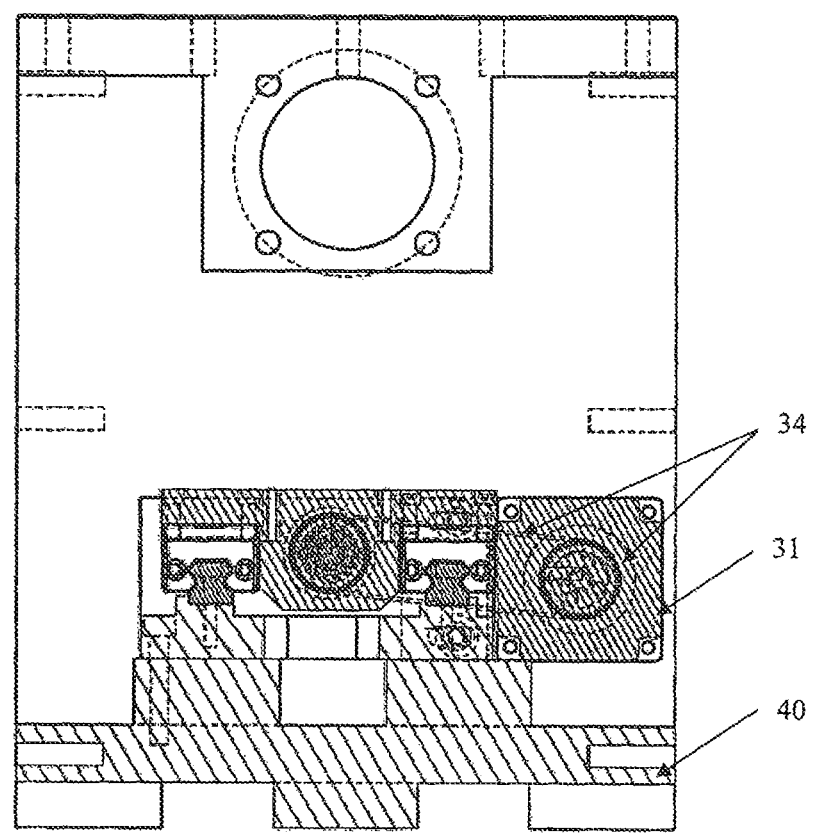
FIG. 5 shows a schematic view of a first moving plate configured in X axis of the five-axis machining apparatus of FIG. 1.

Referring now to FIGS. 1 to 7, a five-axis machining apparatus (100) (hereinafter "the apparatus (100)") in accordance with the present invention is shown. The apparatus (100) operates by allowing movements in X, Y, Z, A and C axes. In a preferred embodiment, the apparatus (100) is a five-axis computer numerical control machine. The apparatus (100) comprises a base member (10), a support member (20), a stationary base (30), a first moving plate (40), a second moving plate (50), a third moving plate (60), a fourth moving frame (70), a fifth moving frame (80) and a controller (not shown.

Specifically, the above mentioned parts of the apparatus (100) are made from metallic components. However, it is understood that the above mentioned parts of the apparatus (100) of varying shapes and dimensions can be made from any suitable materials known in the art. The apparatus (100) is capable of being suitably modified in accordance with various alternate embodiments of the present invention to comprise an automatic tool changer, an automatic lubrication system, a dust collection system, a mist cooling system and the like.

The base member (10) includes the support member (20) extending vertically from one end (not numbered) thereof and the stationary base (30) mounted thereon. Specifically, the stationary base (30) is mounted in X axis on top of the base member (10).

The first moving plate (40) is configured in X axis on the stationary base (30). The first moving plate (40) is capable of being driven by a first driving mechanism (not numbered). The first driving mechanism is positioned between the first moving plate (40) and the stationary base (30). The first driving mechanism includes a first motor (31) and a first driving unit (34) connected thereto. The first motor (31) is selected from any of rotary motors, linear motors and any other types of digital positioning motors known in the art. The rotary motors are selected from but not limited to a group consisting of servo motors, steppers, micro steppers, rotary digital positioning motors and the like. Preferably the first driving unit (34) consists of at least one timing belt and at least one pulley. However, the first driving unit (34) can also be selected from but not limited to a group consisting of a harmonic drive, a cycloid drive, a worm wheel gear box, a worm wheel and shaft unit and the like. In one more embodiment, the first motor (31) can also be connected directly to the ball screws using couplings or any other means for driving the ball screws.

The second moving plate (50) is mounted in Y axis on an upper portion (not numbered) of the support member (20). The second moving plate (50) is capable of being driven by a second driving mechanism (not numbered). The second driving mechanism includes a second motor (41) and a second driving unit (44) connected thereto. The second motor (41) is selected from any of rotary motors, linear motors and any other types of digital positioning motors known in the art. The rotary motors are selected from but not limited to a group consisting of servo motors, steppers, micro steppers, rotary digital positioning motors and the like. Preferably the second driving unit (44) consists of at least one timing belt and at least one pulley. However, the second driving unit (44) can also be selected from but not limited to a group consisting of a harmonic drive, a cycloid drive, a worm wheel gear box, a worm wheel and shaft unit and the like. In one more embodiment, the second motor (41) can also be connected directly to the ball screws using couplings or any other means for driving the ball screws.

The third moving plate (60) is mounted in Z axis on the second moving plate (50) in Y axis perpendicular to the Z axis. The third moving plate (60) is capable of being driven by a third driving mechanism (not numbered). The third driving mechanism includes a third motor (51) and a third driving unit (54) connected thereto. The third motor (51) is selected from any of rotary motors, linear motors and any other types of digital positioning motors known in the art. The rotary motors are selected from but not limited to a group consisting of servo motors, steppers, micro steppers, rotary digital positioning motors and the like. Preferably the third driving unit (54) consists of at least one timing belt and at least one pulley. However, the third driving unit (54) can also be selected from but not limited to a group consisting of a harmonic drive, a cycloid drive, a worm wheel gear box, a worm wheel and shaft unit and the like. In one more embodiment, the third motor (51) can also be connected directly to the ball screws using couplings or any other means for driving the ball screws.

The third moving plate (60) includes a spindle (55) mounted thereon. The spindle (55) includes a cutting tool (53) (herein after 'the tool (53)') configured therein for processing of a work piece/job (not numbered) (herein after 'the job'). In an embodiment, the job is selected from a watch case, an impeller, jewelry bridges, dental bridges and the like. The spindle (55) undergoes linear vertical movement when the third moving plate (60) is driven by the third driving mechanism. The spindle (55) undergoes linear horizontal movement when the second moving plate (50) is driven by the second driving mechanism. The spindle (55) moves linearly for positioning the tool (53) at different locations on the job. In a preferred embodiment, the spindle (55) rotates at 24000 revolutions per minute (RPM) or even at higher RPMs to move the tool (53) independently or simultaneously on the Z-axis and the Y axis. The tool (53) undergoes linear up and down movement on the Z-axis to come in or out of contact with the job. The tool (53) undergoes left and right movements on the Y axis to machine the job.

Furthermore, the first moving plate (40), the second moving plate (50) and the third moving plate (60) on either side (not numbered) are configured with linear motion rail (not numbered) (herein after 'the LM rails') for undergoing smooth rigid motion. In alternate embodiments of the present invention, the smooth rigid motion of the plates (40, 50, and 60) can be achieved by a bush, a dovetail, a roller guide or any other suitable means known in the art.

The fourth moving frame (70) is configured in A axis on the first moving plate (40) that in turn is configured in X axis. The fourth moving frame (70) is capable of being driven in X axis in response to the movement of the first moving plate (40) in X axis upon being driven by the first driving mechanism. The movement of the fourth moving frame (70) drives a first shaft (90) to move in X axis. The first shaft (90) through one end (not numbered) is configured on a lower portion (not numbered) of the support member (20) to undergo in and out linear movement in X axis.

The fourth moving frame (70) comprises a fourth driving mechanism (not numbered). The fourth driving mechanism includes a fourth motor (61) and a fourth driving unit (64). The fourth motor (61) is selected from any of rotary motors and any other types of digital positioning motors known in the art. The rotary motors are selected from but not limited to a group consisting of servo motors, steppers, micro steppers, rotary digital positioning motors and the like. Preferably the fourth driving unit (64) is a worm wheel and shaft unit. However, it is understood that the fourth driving unit (64) can also be selected from but not limited to a group consisting of a harmonic drive, a cycloid drive, a worm wheel gear box, a timing belt and pulley and the like.

The fourth driving mechanism of the fourth moving frame (70) further drives the first shaft (90) to rotate in A axis. Thus, the first shaft (90) is capable of undergoing simultaneous as well as independent movements on the A and X axes.

The fifth moving frame (80) is mounted in C axis on another end of the first shaft (90). The fifth moving frame (80) is capable of being driven in X axis as well as in A axis. The fifth moving frame (80) moves in X axis in response to the movement of the first moving plate (40) by the first driving mechanism. The fifth moving frame (80) swings in A axis in response to the rotation of the first shaft (90) in A axis by the fourth driving mechanism. The fifth moving frame (80) comprises a second shaft (72), a chuck (75) and a fifth driving mechanism (not numbered). The chuck (75) is adapted for holding the job. The chuck (75) is mounted on an end (not numbered) of the second shaft (72). The second shaft (72) is capable of being driven by the fifth driving mechanism. The second shaft (72) upon being driven rotates causing the chuck (75) to rotate in C axis. Thus, the job on the chuck (75) is positioned at various locations with respect to the tool (53) due to the linear movement of the fifth moving frame (80) in X axis, swinging movement of the fifth frame (80) in A axis as well as due to the rotation of the second shaft (72) and thus of the chuck (75) in C axis.

The fifth driving mechanism includes a fifth motor (71) and a fifth driving unit (74). The fifth motor (71) is selected from any of rotary motors and any other types of digital positioning motors known in the art. The rotary motors are selected from but not limited to a group consisting of servo motors, steppers, micro steppers, rotary digital positioning motors and the like. Preferably the fifth driving unit (74) consists of at least one timing belt and at least one pulley. However, it is understood that the fifth driving unit (74) can also be selected from but not limited to a group consisting of a harmonic drive, a cycloid drive, a worm wheel gear box, a worm wheel and shaft unit and the like. The selection of the type of the driving units (34, 44, 54, 64 and 74) of each driving mechanism depends on the job material to be cut as well as on the accuracy required.

The controller is configured for controlling the movements of the first moving plate (40), the second moving plate (50), the third moving plate (60), the first shaft (90) and the second shaft. In a preferred embodiment, the controller is a computer numerical control (CNC) controller.

Referring again to FIGS. 1 to 5, a machining operation of the apparatus (100) is illustrated in accordance with the present invention. The machining operations result in movement of the tool (53) as well as of the job.

Movement of the Tool (53):

When the second driving mechanism drives the second moving plate (50) in Y axis, the second moving plate (50) moves by sliding on the LM rails and causes the spindle (55) to move the tool (53) horizontally in Y axis for machining the job.

When the third driving mechanism drives the third moving plate (60) in Z axis, the third moving plate (60) moves by sliding on the LM rails and causes the spindle (55) to move the tool (53) vertically in Z axis, wherein the tool (53) undergoes downward vertical movement to come in contact with the job and undergoes upward vertical movement to go out of contact from the job. Thus, the tool (53) undergoes linear vertical movement in Z axis as well as linear horizontal movement in Y axis to position over the job and to machine the job.

Movement of the Job:

When the first driving mechanism drives the first moving plate (40) in X axis, the first moving plate (40) moves on the stationary base (30) by sliding on the LM rails that in turn drives the fourth moving frame (70) in X axis thereby causing the first shaft (90) to move linearly in and out in X axis. Further, the movement of the first shaft (90) in X axis results in movement of the fifth moving frame (80) mounted at the end of the first shaft (90). The movement of the fifth moving frame (90) in X axis moves the job held in the chuck (75).

When the fourth driving mechanism rotates the first shaft (90) in A axis, the fifth moving frame (80) starts swinging in A axis to position the job with respect to the tool (53).

When the fifth driving mechanism drives the second shaft (72) in C axis, the second shaft (72) rotates causing the chuck (75) to undergo rotary motion in C axis thereby positioning the job with respect to the tool (53) for processing thereof.

Advantages Found in Some Embodiment

1. The apparatus (100) is designed such that the first shaft (90) holds three (A, C and X) axes resulting in a reduced size without compromising on rigidity that is required for processing metallic job components.
2. The apparatus (100) is small enough to be easily mountable on a desktop or top of a table.
3. The apparatus (100) comfortably holds the jobs of smaller size.
4. The apparatus (100) allows independent as well as simultaneous control of X, Y, Z, A and C axes.
5. The apparatus (100) is cost effective compared to other 5-axis machines.

The foregoing aspects of the disclosure are accomplished and the problems and shortcomings associated with prior art techniques and approaches are overcome by the present disclosure described in the present embodiment. Detailed descriptions of the preferred embodiment are provided herein; however, it is, understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or matter. The embodiments of the invention as described above and the methods disclosed herein will suggest further modification and alterations to those skilled in the art. Such further modifications and alterations may be made without departing from the spirit and scope of the invention.

I claim:

1. A five-axis machining apparatus, comprising:
a base member;
a support member extending vertically from a first end of the base member;
a stationary base mounted on top of the base member;
a first moving plate configured for movement along an X-axis on the stationary base, the first moving plate capable of being driven for said movement along the X-axis by a corresponding first driving mechanism;
a second moving plate supported on an upper portion of the support member, the second moving plate capable of being driven for movement along a Y-axis by a corresponding second driving mechanism, wherein the Y-axis extends perpendicularly to the X-axis;
a third moving plate mounted on the second moving plate, the third moving plate capable of being driven for movement along a Z-axis by a corresponding third driving mechanism, the Z-axis extending perpendicularly to each of the X-axis and the Y-axis, and the third moving plate having a spindle mounted thereon, wherein the spindle has a cutting tool mounted therein;
a first shaft with opposing first and second ends, wherein the first shaft extends into and through an opening in a lower portion of the support member such that the first end of the first shaft is located on a first side of the support member and the second end of the first shaft is located on an opposing second side of the support member;
a fourth moving frame mounted on the first moving plate, wherein the fourth moving frame is driven for movement along the X-axis in response to the movement of the first moving plate along the X-axis, the fourth moving frame receiving the first end of the first shaft and comprising a fourth driving mechanism for driving the first shaft for rotation about an A-axis, which extends parallel to the X-axis;
a fifth moving frame mounted on the second end of the first shaft, the fifth moving frame being driven for movement along the X-axis in response to the movement of the first moving plate along the X-axis, and being driven for swinging movement about the A-axis in response to the rotation of the first shaft, wherein the fifth moving frame has a second shaft, a chuck mounted on the second shaft for holding a workpiece, and a fifth driving mechanism for driving the second shaft and the chuck to rotate about a C-axis; and
a controller for controlling the movements of the first moving plate, the second moving plate, the third moving plate, the first shaft, and the second shaft; wherein
linear movement of the fifth moving frame along the X-axis, swinging movement of the fifth moving frame about the A-axis, and rotation of the chuck about the C-axis results in positioning the workpiece at various locations with respect to the cutting tool.

2. The five-axis machining apparatus as claimed in claim 1, wherein the controller is a computer numerical control controller.

3. The five-axis machining apparatus as claimed in claim 1, wherein the first moving plate, the second moving plate, and the third moving plate are respectively configured with any of one linear motion rails, a bush, a dovetail, and a roller guide for undergoing smooth rigid motion.

4. The five-axis machining apparatus as claimed in claim 1, wherein the driving mechanisms include respective motors with associated driving units connected thereto.

5. The five-axis machining apparatus as claimed in claim 1, wherein the first, second, and third driving mechanisms each have an associated rotary or linear motor that provides for the movement of the corresponding moving plate.

6. The five-axis machining apparatus as claimed in claim 1, wherein the fourth and fifth driving mechanisms each have an associated motor that is embodied as a rotary motor.

7. The five-axis machining apparatus as claimed in claim 1, wherein each of the driving units is selected from any of a timing belt and pulley, a harmonic drive, a cycloid drive, a worm wheel gear box, and a worm wheel and shaft unit.

8. The five-axis machining apparatus as claimed in claim 1, wherein the spindle undergoes linear vertical movement when the third moving plate is driven for movement along the Z-axis by the third driving mechanism.

9. The five-axis machining apparatus as claimed in claim 1, wherein the spindle undergoes linear horizontal movement when the second moving plate is driven for movement along the Y-axis by the second driving mechanism.

* * * * *